(12) United States Patent
Kageyama

(10) Patent No.: US 6,484,078 B1
(45) Date of Patent: Nov. 19, 2002

(54) VEHICLE TRAVEL ROUTE CONTROL SYSTEM

(75) Inventor: Masato Kageyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 93 days.

(21) Appl. No.: 09/694,685

(22) Filed: Oct. 24, 2000

(30) Foreign Application Priority Data

Oct. 26, 1999 (JP) ............................................. 99-304113

(51) Int. Cl.$^7$ ................................................. G01S 5/14
(52) U.S. Cl. ............................ 701/25; 701/50; 701/23; 701/117; 340/989
(58) Field of Search ............................ 701/25, 23, 26, 701/50, 24, 117; 340/989, 988

(56) References Cited

U.S. PATENT DOCUMENTS

| | | | | |
|---|---|---|---|---|
| 3,979,731 A | * | 9/1976 | Naplatanov et al. | 340/993 |
| 4,465,155 A | * | 8/1984 | Collins | 180/169 |
| 5,625,559 A | * | 4/1997 | Egawa | 701/117 |
| 5,646,844 A | * | 7/1997 | Gudat et al. | 701/208 |
| 5,752,207 A | * | 5/1998 | Sarangapani | 701/210 |
| 5,925,081 A | * | 7/1999 | Hawkins et al. | 701/24 |
| 6,044,312 A | * | 3/2000 | Sudo et al. | 340/988 |
| 6,246,932 B1 | * | 6/2001 | Kageyama et al. | 340/992 |

FOREIGN PATENT DOCUMENTS

WO    WO 9837468 A1 *  8/1998  .......... G05D/01/02

* cited by examiner

*Primary Examiner*—Yonel Beaulieu
*Assistant Examiner*—Eric M Gibson
(74) *Attorney, Agent, or Firm*—Varndell & Varndell, PLLC

(57) ABSTRACT

Working efficiency is improved without wasted activity of vehicles by enabling prompt change of a travel route at a time when it becomes necessary to change the travel route of a vehicle. A monitor station changes a worksite towards which a vehicle should travel from a worksite 60$a$ to a worksite 60$a'$ on the basis of a result of monitoring current positions of a plurality of vehicles and current status of a plurality of worksites. At the same time, the monitor station provides data for the travel route from the current positions of the vehicles to the changed worksite 60$a$ to the vehicles. Upon receiving the data for the travel route from the monitor station, the vehicles then travel along the travel route from their current positions to the changed worksite 60$a'$.

6 Claims, 10 Drawing Sheets

VEHICLE TRAVEL ROUTE CONTROL SYSTEM

BACKGROUND OF THE INVENTION

1. Field of the Invention

The present invention relates to a vehicle control system for managing vehicles travelling toward a worksite.

2. Description of the Related Art

In order to improve the efficiency of mining operations in a large scale mining area, the loaders (excavator, wheel loader), dump trucks, and so forth are made large in size. In other words, instead of running a plurality of dump trucks with a plurality of operators, attempts are being made to run a small number of dump trucks with a small number of operators by making the dump trucks larger. These dump trucks have reached the 200 t capacity class.

Particularly in recent years, unmanned dump trucks (unmanned vehicles) have come to be widely used with the dissemination of position measuring devices such as GPS (global positioning system) and human labor has been correspondingly reduced. In other words, a position measuring device such as GPS is deployed on the unmanned vehicle, compares the position measured with this position measurement device to the positions in the stored course data, and controls the vehicle so that these positions agree. The unmanned vehicle thereby travels along a predetermined course.

At the level to which unmanned vehicles were initially introduced, the unmanned vehicles performed work to transport ore from a predetermined loader to a predetermined earth removal site.

In a mining area, a plurality of loaders at a plurality of loading sites and a plurality of earth removal devices at a plurality of earth removal sites (hoppers for crushing and refining the ore and stockyards as temporary holding sites) are operating at the same time. For this reason, when any of the plurality of loaders and earth removal devices become unable to work temporarily for reasons such as a failure, it becomes necessary to provide orders for changing the travel route to the unmanned vehicles headed thereto. The change in the travel route is necessary in order to eliminate wasteful waiting time for the unmanned vehicles.

For example, a fleet 1 (group of unmanned vehicles) engaged in transport operations from an excavator A to a hopper B and a fleet 2 engaged in transport operations from an excavator C to a hopper D are working in parallel at the same time. Under these conditions, when the operator of the excavator A takes a break, it would be desirable for the unmanned vehicles in fleet 1 to shift to fleet 2, travel the travel route of fleet 2, and continue the transport operations without interruption.

A temporary work stoppage for one fleet and a loss of working efficiency often occur in cases other than when an operator takes a break. For example, a loader may engage in road maintenance at the loading site, making embankments for safety purposes, or making roads for the loader itself to travel upon during breaks from loading operations. In these cases as well, the operations for one fleet may be temporarily halted, causing reduced efficiency. Furthermore, the movement of a loader within the loading site, failure of a hopper, overflow, obstacles on the route traveled by the unmanned vehicles, and reductions in travel speeds of the unmanned vehicles due to quagmires on the travel route can temporarily halt work by a fleet and cause reduced efficiency.

In cases where there is a risk of reducing the efficiency of a fleet 1 in this way, the unmanned vehicles scheduled to perform work in the fleet 1 must be moved to another fleet 2, caused to take the travel route of the fleet 2, and sent to those loading sites and earth removal sites.

In the conventional art, a system is constituted wherein the travel route is changed once the unmanned vehicles have first traveled to a predetermined location. For example, the excavator A for fleet 1 temporarily stops work. The unmanned vehicles in fleet 1 continue to travel along the fleet 1 travel route and reach a predetermined location (for example, the entrance to the site where the excavator A is present). Then, at this predetermined location, the unmanned vehicles received instructions to "change to the fleet 2 travel route" from a monitor station. According to these orders, the unmanned vehicles travel the fleet 2 travel route to the loading site (excavator C) for the fleet 2.

This type of technology is noted in the following reports.

For example, the Japanese Patent application Laid-Open No. 7-20939 (conventional art A) includes an invention wherein an unmanned transport vehicle traveling indoors is caused to move to and wait at a predetermined location (position of control information transmission device) on the transport path. At this waiting location, data for a changed transport path is provided to the unmanned transport vehicle.

Also, the Japanese Patent Application Laid-Open No. 10-181888 (conventional art B) includes an invention wherein a mobile machine is caused to travel to and wait at a mining site, and at this mining site, the mobile machine is provided orders for its next movements (movement to reentry path) depending on the current situation in the mining site (failure of loader or hopper).

Furthermore, in the Japanese Patent Application Laid-Open No. 8-263138 (conventional art C), an unmanned dump truck is caused to follow a travel course to a loading site and stop at the entry to the loading site. While stopped at this location, the vehicle generates data for a course from that position corresponding to the position of the loading machine and provides this course data to the unmanned vehicle.

This conventional art A, B, and C applies to cases wherein an excavator A temporarily stops work for a fleet 1. In this case, the unmanned vehicles in the fleet 1 must travel on the travel route for the fleet 1 and arrive at the entry for the loading site where the excavator A, that has temporarily stopped work, is located. It is then necessary for the unmanned vehicles to stop at the entry to the loading site and wait at this location for instructions from a monitor station. Then, after receiving the instructions changing the travel route from the monitor station, the unmanned vehicles must shift to the other fleet 2, follow the travel route for fleet 2, and go to the loading site (excavator C) for the fleet 2.

In this conventional art, it is not possible to change the travel route unless the unmanned vehicles have traveled to and stopped at a predetermined location. For this reason, the unmanned vehicles operate to no purpose and working efficiency is greatly reduced.

The present invention was made in view of these facts. It is a first object of the present invention to eliminate wasteful activity of the vehicles and to improve efficiency by making it possible to promptly change the travel route at the time when it becomes necessary to change the travel route of a vehicle.

The unmanned vehicles receive data for the scheduled travel route from the monitor station and travel along this scheduled travel route.

At the monitoring station, however, the decision is made whether it is necessary to change the initially provided travel route according to monitoring results. In this case, travel instructions are provided by the monitor station to the unmanned vehicle and instruct the unmanned vehicle to turn off at an intersection with the scheduled travel route and to follow the changed travel route. When the current position of the unmanned vehicle is sufficiently distant from the intersection, there is leeway for traveling and for performing navigation control and the unmanned vehicle can turn off at the intersection without leaving the travel route. However, when the current position of the unmanned vehicle is close to the intersection, there is no leeway for traveling and navigation control. For this reason there is a risk of the unmanned vehicle leaving the travel route near the intersection. Departure from the travel route (road surface leveled on one of two lanes for going back and forth) may bring about collisions with other vehicles, while increasing the risk of the vehicle overturning on the shoulder, or colliding with embankments or rock falls from cliffs.

The present invention was made in view of these facts. It is a second object of the present invention to definitely avoid leaving the travel route so as to avoid major accidents such as collisions with other vehicles, overturning, or landslides, even in the case where travel instructions to turn off at an intersection with the scheduled travel route are provided from the monitor station.

In a mining area, a plurality of vehicles arrive sequentially at a single worksite (for example, a loading site) and the loading work is performed in the order of arrival. The travel speed of manned dump trucks (manned vehicles) depends on the operator. For this reason, manned vehicles travel at any speed and arrive at the worksite in accordance with the operations by the operator. Also, unmanned vehicles travel at speeds and arrive at the worksite in accordance with speed data provided by the monitor station.

However, when another vehicle arrives at the worksite before a particular vehicle, that particular vehicle must wait at the worksite until the other vehicle's work is complete.

Consequently, when the travel speed on a vehicle is set high and the vehicle travels to the worksite at a high speed, the early arrival results in a corresponding increase to the waiting time. For this reason, wasteful waiting time occurs for a particular vehicle and the efficiency is reduced by that waiting time. Moreover, when caused to travel at high speeds, a dump truck will have higher operating costs as well as wasteful waiting times. Specifically, wear on the tires is accelerated by the extent that the dump truck travels at high speeds to worksites. A dump truck uses special tires and the unit cost of the tires is very high. High speed travel increases wear on the tires and shortens the time between tire replacement. For this reason, the operating costs of the dump trucks become very high. Furthermore, fuel costs are increased due to the dump trucks traveling to worksites at high speeds. For this reason, fuel costs become high and also become a factor in raising the operating costs of the dump trucks.

It was thought that establishing low vehicle travel speeds would avoid these operating cost increases. However, even though the problem of increased dump truck operating costs is resolved when vehicles travel at those speeds, the time necessary to travel to a worksite is increased and work is started with the preceding vehicle having already completed its work. For this reason, wasteful free time, wherein loading work is not being performed at the worksite, occurs. The occurrence of this wasteful free time in conjunction with all of the vehicles traveling at low speeds results in a loss of working efficiency.

Before now, there have been no inventions for setting the speed of a particular vehicle in relation to another vehicle arriving at the worksite in advance thereof The present invention was made in view of these facts. It is a third object of the present invention to be able to greatly increase working efficiency by starting work at a worksite in an optimum waiting time, while minimizing vehicle operating costs.

Moreover, Japanese Patent Application Laid-Open No. 11-126294 (conventional art D) is cited as showing the general technical level of this application. This report makes note of an invention wherein, when a plurality of automobiles enter an intersection, the path of each automobile is generated so that there is no conflict in the intersection. However, this conventional art D is only an invention for resolving the problem of conflict in an intersection. This point is different from the present invention which has the object of optimizing vehicle waiting times at a worksite, improving efficiency, and minimizing vehicle operating costs.

SUMMARY OF THE INVENTION

In order to achieve the abovementioned first object, the first invention relating to the present invention is a vehicle travel route control system applied to a case where a plurality of vehicles travel towards a plurality of worksites and perform works at the plurality of worksites, comprising: a monitor station for changing a worksite to which the vehicles should travel and providing to the vehicles data for a travel route to the changed worksite; and vehicles traveling along the travel route from their current positions to the changed worksite when the data for the travel route are provided from the monitor station, wherein the monitor station changes the worksite to which the vehicles should travel on the basis of a result from monitoring current positions of the plurality of vehicles and current status of the plurality of worksites, and directly provides the data for the travel route from the current positions of the vehicles to the changed worksite on the basis of a result from monitoring the current positions of the plurality of vehicles and current status of the plurality of worksites; and wherein the vehicles have position measuring devices for measuring the current positions of the vehicles, provide the current positions of the vehicles measured by the position measuring devices to the monitor station, and travel along the changed travel route from the current positions to the changed worksite when the data for the travel route are provided from the monitor station, while the vehicles are on any of the travel route of the vehicle.

In the first invention, the second invention is featured that the monitor station changes the worksite to which the vehicles should travel so as to maximize a working efficiency at the plurality of worksites.

In the first invention, the third invention is featured that the monitor station selects a travel route with a shortest travel time in a case where there is a plurality of travel routes from the current positions of the vehicles to the changed worksite.

The abovementioned first invention (second invention, third invention) is explained with reference to FIG. 1(b).

According to the first invention, the monitor station 20 changes the worksite to which the vehicle 30 should travel from worksite 60a to worksite 60a' based on the results of monitoring the current positions of the plurality of vehicles 30, 30' and the current status of the plurality of worksites 60a, 60a', while providing to the vehicle 30 the data for the travel route from the current position of the vehicle 30 to the changed worksite 60a. When the data for the travel route are provided from the monitor station 20, the vehicle 30 travels along this travel route from its current position to the changed worksite 60a'.

In this way, with the first invention, the travel route of the vehicle 30 can be changed and the vehicle 30 can be caused to travel along the changed travel route at the time when a failure of the loaders 60 occurs at the worksite 60a and it becomes necessary to change the travel route of the vehicle 30. It is not necessary for the vehicle 30 to travel to, and stop and wait at the worksite 60a at which work is temporarily halted as in the prior art. The travel route can be changed at the current location while the vehicle 30 is traveling. For this reason, wasteful movement of the vehicle 30 is eliminated and the efficiency is greatly increased.

In order to achieve the abovementioned second object, the fourth invention relating to the present invention is a vehicle travel route control system comprising: a monitor station for changing a travel route that a vehicle should travel when the vehicle is traveling along a scheduled travel route toward a worksite and providing data for the changed travel route to the vehicle; and a vehicle for turning at an intersection of the scheduled travel route onto the changed travel route and traveling along the changed travel route when the data for the changed travel route are provided by the monitor station, wherein, when the travel route is changed, the vehicle or the monitor station determines whether to travel along the scheduled travel route or the changed travel route after the intersection based on a distance from a current position on the scheduled travel route to the intersection; and wherein the vehicle is an unmanned vehicle having a position measuring device for measuring a current position of the vehicle, which provides the current position of the vehicle measured by the position measuring device to the monitor and travels according to a result of the determination.

The abovementioned fourth invention is explained with reference to FIGS. 9(a) and 9(b).

According to the fourth invention, the vehicle 30, upon receiving the data for the changed travel route Kb from the monitor station 20, determines whether to travel along the scheduled travel route Ka or to travel along the changed travel route Kb after the intersection X based on the distance from the current position on the scheduled travel route Ka to the intersection X. This determination can also be made by the monitor station 20. The vehicle 30 travels according to the results of this determination. Specifically, when the distance is less than an established threshold value, the vehicle will travel along the scheduled travel route Ka after the intersection (FIG. 9(b)) because there is a risk of the vehicle leaving the travel route when turning at the intersection X. If the distance is greater than the threshold value, the vehicle will travel along the changed travel route Kb after the intersection (FIG. 9(a)) because there is no risk of the vehicle leaving the travel route when turning at the intersection X.

In this way, with the fourth invention, it becomes possible to insure the selection of the travel route having no risk of the vehicle leaving the travel route even when travel instruction to turn at the intersection X with the scheduled travel route Ka are received from the monitor station 20. For this reason, departure from the travel route is certainly prevented and major accidents such as collisions with other vehicles, overturning, or landslides are avoided.

In order to achieve the abovementioned third object, the fifth invention relating to the present invention is a vehicle control system applied to a case where a plurality of vehicles travel towards a worksite and the plurality of vehicles perform works in sequence at the worksite, comprising: a monitor station for providing to the vehicles data for a travel route to the worksite to which the vehicles should travel and data for a travel speed; and vehicles which, when the data for the travel route and the data for the travel speed are provided from the monitor station, travel along the travel route from their current positions to the worksite at the travel speed;

wherein the monitor station estimates a waiting time until the work begins for each vehicle based on a relationship between the current positions of the plurality of vehicles and a location of the worksite, and provides the data for the travel speed to each vehicle so as to be able to begin the work in an optimum waiting time based on a result of this estimate.

In the fifth invention, the sixth invention is featured that the monitor station finds an order of arrival at the worksite and an arrival time from the current position until arrival at the worksite for each vehicle, based on the relationship between the current positions of the plurality of vehicles and the location of the worksite, estimates a waiting time until the work begins for each vehicle, based on the order of arrival and the arrival time thus found and a working time required for one vehicle at the worksite; and generates data for the travel speed for each vehicle based on a result of this estimate so that the vehicles can arrive at the worksite in an optimum arrival time and can begin the work in the optimum waiting time.

The abovementioned fifth invention (sixth invention) is explained with reference to FIGS. 11(a) and 11(b).

With the fifth invention, in the monitor station 20, the waiting time Tw2, Tw3 until work begins is estimated for each vehicle 30', 30 based on the relationship between the current positions G2, G3 of the plurality of vehicles 30', 30 (FIG. 11(a)). Based on the results of this estimate, the data for speed of travel are provided to each vehicle 30', 30 in order that work can begin in the optimum waiting times Tbw2, Tbw3. For this reason, the speed of travel of the vehicle 30, for example, is set at a lower speed and the vehicle travels at this low speed to the worksite. The vehicle 30 then can begin work in the optimum waiting time Tbw3 (FIG. 11(b)).

In this way, with the fifth invention, working efficiency can be greatly improved while the operating costs of the vehicles are minimized because the speed of travel of the vehicles is set so that work can begin in the optimum waiting time.

DESCRIPTION OF THE PREFERRED EMBODIMENTS

The preferred embodiments of the vehicle control system relating to the present invention are explained below with reference to the drawings.

Figure 1A:
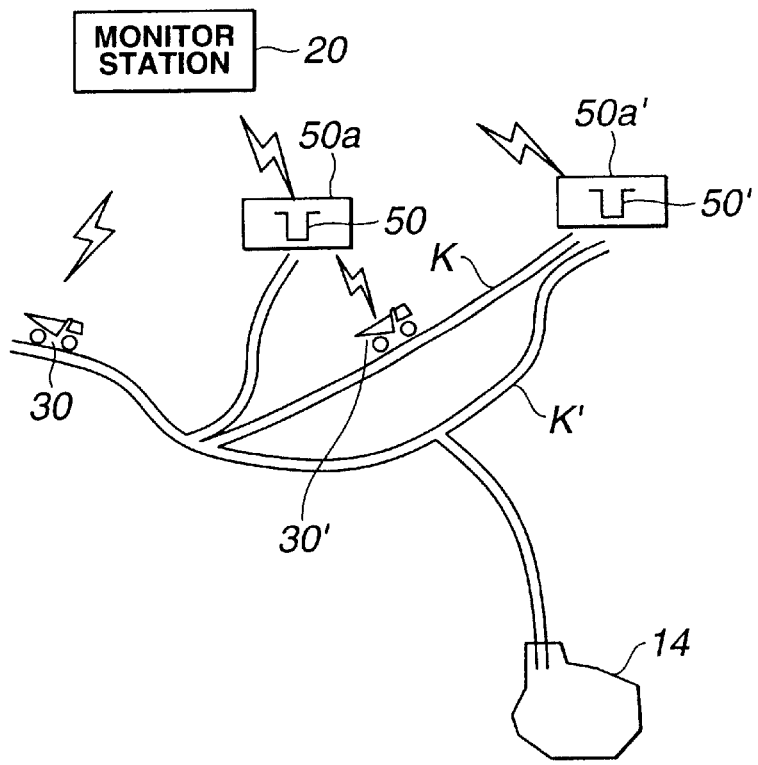
FIGS. 1(a) and 1(b) are drawings showing examples of the arrangement of principal elements of an embodiment.

FIGS. 1(a) and (b) are drawings showing examples of the arrangement of principal elements of an embodiment.

FIG. 1(a) shows the relationships between the positions of the monitor station 20 for managing a plurality of unmanned vehicles 30, 30'; hoppers 50, 50' for containing the load (ore or the like) for the unmanned vehicles 30, 30' and performing load processing work (ore processing work); earth removal sites (unloading sites) 50a, 50a' where the hoppers 50, 50' respectively are established and the earth removal (unloading) work is performed; a temporary holding site 14 where the loads of the unmanned vehicles 30, 30' are unloaded and the loads are temporarily located; and the travel routes followed by the unmanned vehicles 30, 30'. This drawing shows the situation wherein the unmanned vehicles 30, 30' are provided orders from the monitor station 20, follow travel routes, and travel to the hoppers 50, 50' in the earth removal sites 50a, 50a'. Moreover, the temporary holding site (stockyard) 14 is an area for temporarily holding the ore that cannot currently be taken to hoppers 50, 50' or when the hoppers 50, 50' are out of order. In the temporary holding site 14, the ore is arranged by its composition.

Figure 1B:
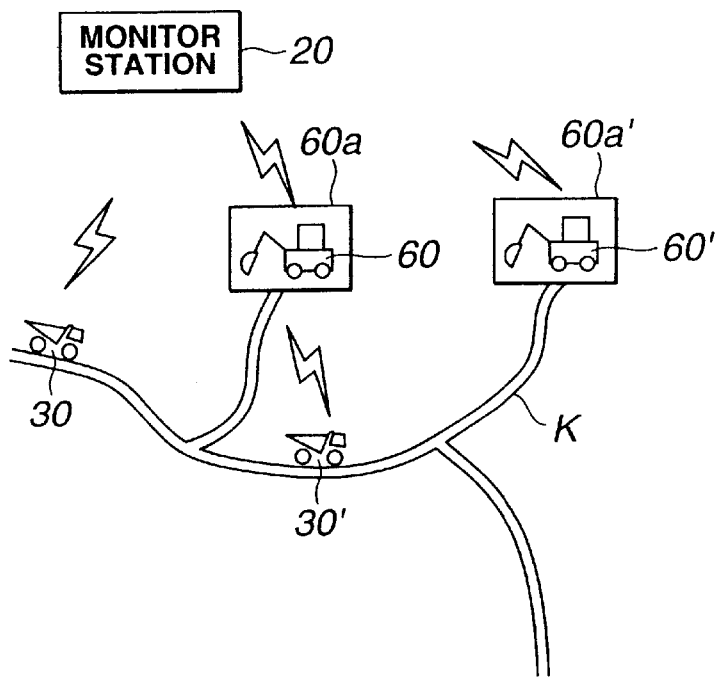

Also, FIG. 1(b) shows the relationships between the locations of the monitor station 20 for managing a plurality of unmanned vehicles 30, 30'; the loaders (for example, excavators) 60, 60' for placing a load (ore or the like) into the unmanned vehicles 30, 30'; the loading sites 60a, 60a' wherein the loaders 60, 60' travel about and perform loading work; and the travel routes followed by the unmanned vehicles 30, 30'. The drawing shows the situation wherein the unmanned vehicles 30, 30' are provided orders from the monitor station 20, follow travel routes, and travel to the loaders 60, 60' in the loading sites 60a, 60a'.

Although not shown in FIG. 1, a plurality of manned vehicles 40 are present in addition to the unmanned vehicles 30, 30'. The manned vehicles 40 travel along the same travel routes as the unmanned vehicles and perform the same type of work.

The constitution of the monitor station 20 is explained next.

Figure 2:
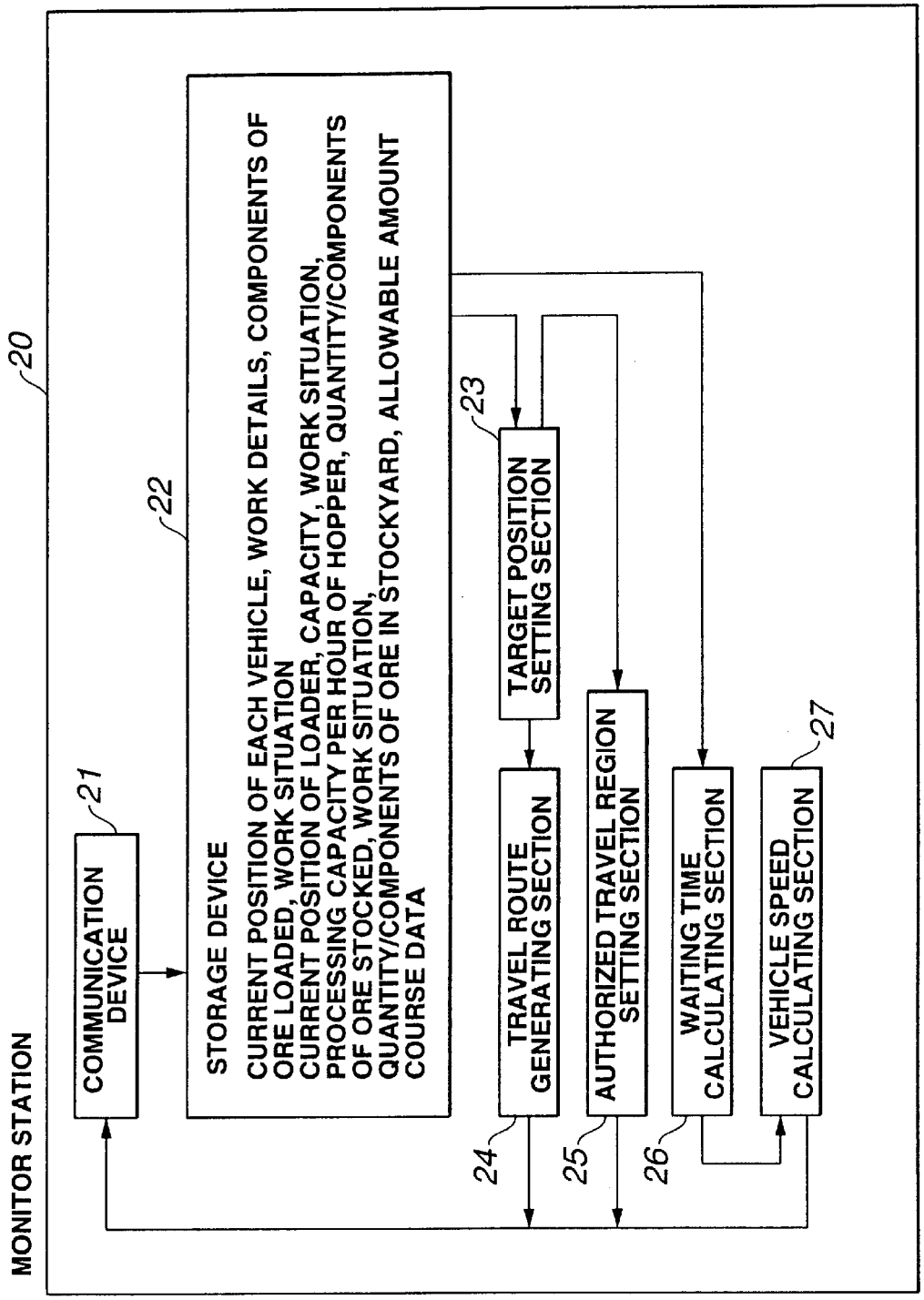
FIG. 2 is a functional block diagram of the monitor station.

FIG. 2 is a functional block diagram showing the constitution of the monitor station 20 relating to the embodiment.

As shown in FIG. 2, the monitor station 20 comprises a communication device 21, a storage device 22, a worksite setting section 23, a travel route setting section 24, an authorized travel region setting section 25, a waiting time calculating section 26, and a vehicle speed setting section 27.

The communication device 21 comprises two channels, a wireless channel 1 for wider range communication at low speeds and a wireless channel 2 for communication within a local range at high speeds. Consequently, communication between the monitor station 20 and the vehicles 30, 30', 40 can be performed using the wireless channel 1. Also, communication between the monitor station 20 and the hoppers 50, 50' can be performed using the wireless channel 1. Also, communication between the monitor station 20 and the loaders 60, 60' can be performed using the wireless channel 1. Also, vehicle to vehicle communication can be performed using the wireless channel 2.

The data taken up via the communication device 21 are stored in the storage device 22. The storage device 22 also stores the following: processing capacity per unit time (number of vehicles received) for the hoppers 50, 50'; the operating situation of the hoppers 50, 50' (failure status, stocker capacity); the composition of the ore being processed by hoppers 50, 50'; the cycle time for each hopper 50, 50' (working time for the hoppers 50, 50' to unload one vehicle); the cycle time of each loader 60, 60' (working time for the loaders 60, 60' to load one vehicle); the operating situation of the loaders 60, 60' (failure status, stocker capacity); composition of the ore being loaded by the loaders 60, 60'; composition of the ore being carried to the stockyard 14; authorized capacity of the stockyard 14; current positions of the unmanned vehicles 30, 30' and manned vehicles 40; operating situation of the unmanned vehicles 30, 30' and manned vehicles 40; presence of a load; and contents of the load.

In the target position setting section 23, the target position toward which the vehicles 30, 30', and 40 should travel, meaning the hoppers 50, 50' and stockyard 14 in FIG. 1(a) and the loaders 60, 60' in FIG. 1(b) are established based on data stored in the storage device 22 in order to maximize working efficiency as discussed below. Moreover, the frequency and quantity of ore removed to the stockyard 14 are counted by ore composition and the frequency and quantity removed from the stockyard 14 are counted in the monitor station 20. The quantity of ore already in the stockyard 14 and the quantity that can be stocked in the stockyard 14 from the current point in time are managed based on the results of this count and data relating to the stockyard 14 stored in the storage device 22. The number of vehicles that can be headed for the stockyard 14 can be established from the quantity of ore that can be stocked in the stockyard 14.

The travel routes, by which the vehicles 30, 30', 40 can travel in the shortest time from their current positions to the target positions established in the target position setting section 23, are generated in the travel route setting section 24.

In order to avoid conflicts among the vehicles, the region that can be traversed without conflicting with other vehicles is indicated for each vehicle as the authorized travel region in the authorized travel region setting section 25. This authorized travel region is calculated from time to time according to the movements of the vehicles and indicated for each vehicle.

In the waiting time calculating section 26, the arrival order Norder for arrival at the target position and the estimated travel time Treach from the current position to the target position are found for each vehicle based on the relative positions of the current positions of the plurality of vehicles 30, 30', 40 and the target positions 50, 50', 14, 60, 60'. Based on these values and the working time (cycle time) Ts required for one vehicle at the target position, the estimated waiting time Twait until work begins is calculated for each vehicle.

In the vehicle speed calculating section 27, the speed of travel v for each vehicle is calculated based on the abovementioned estimated waiting time Twait, so that the vehicle can arrive at the worksite in the optimum travel time Tbestreach and can begin work in the optimum waiting time Tbestwait.

Next, the constitution of the unmanned vehicles 30, 30' relating to the present embodiment is explained.

Figure 3:
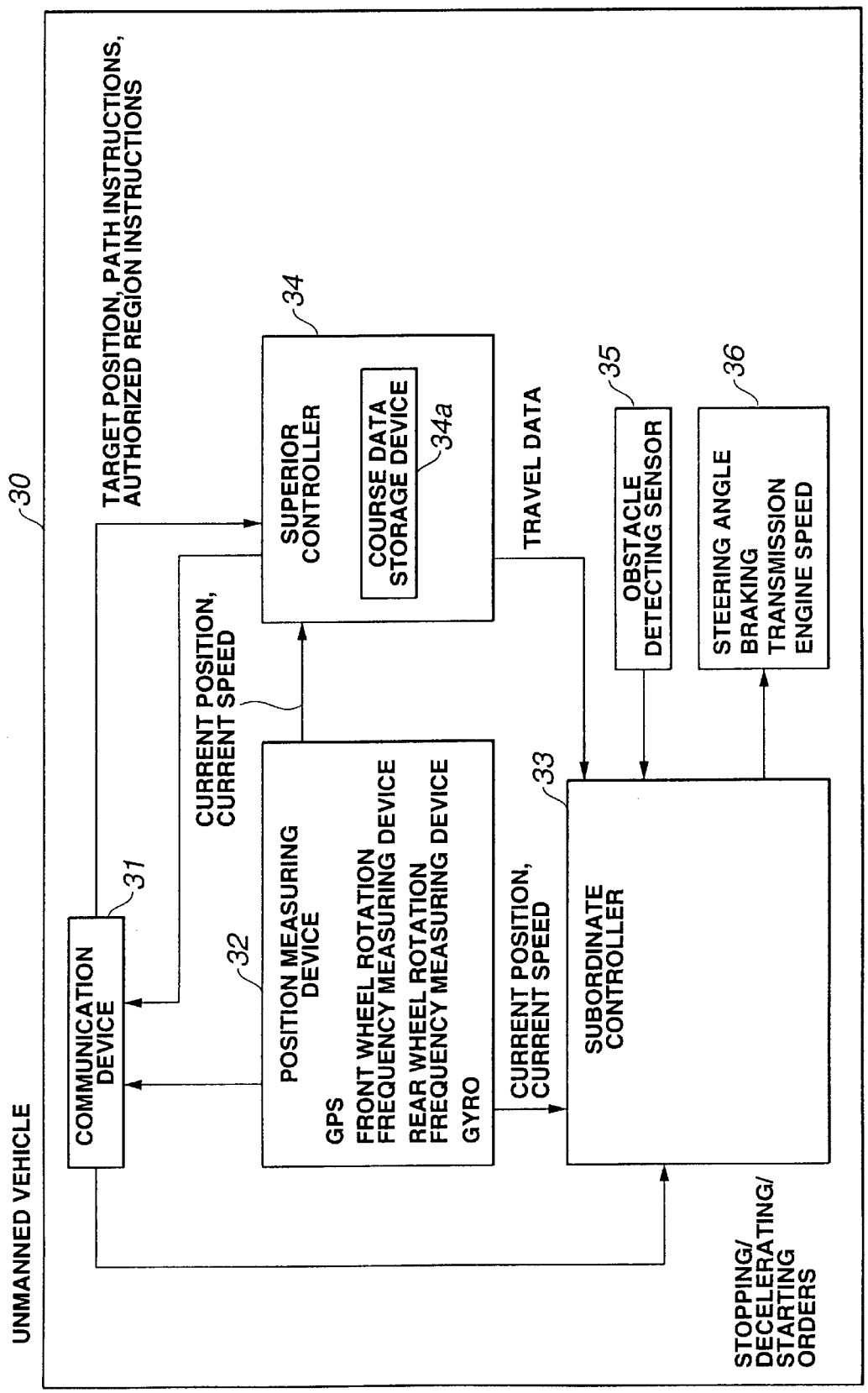
FIG. 3 is a functional block diagram of an unmanned vehicle.

FIG. 3 is a functional block diagram showing the constitution of the unmanned vehicle 30 relating to the present embodiment. The other unmanned vehicle 30'has the same constitution.

As shown in FIG. 3, the unmanned vehicle 30 comprises a communication device 31, a position measuring device 32, an obstacle detecting sensor 35, a superior controller 34, a subordinate controller 33, and a vehicle control system 36.

The communication device 31 comprises two channels like the abovementioned communication device 21: a wireless channel 1 and a wireless channel 2.

A position measuring device using GPS is established in the position measuring device 32. In GPS, the current position of the vehicles 30 is measured by receiving radio waves sent from GPS satellites. Also, a front wheel rotation frequency measuring device for measuring the rotation frequency of the front wheels of the vehicle 30, a rear wheel rotation frequency measuring device for measuring the rotation frequency of the rear wheels of the vehicle 30, and a gyro (for example, optic fiber gyro) for measuring the orientation of the vehicle 30 are established. The current position of a particular vehicle 30 is measured based on the wheel rotation frequency measured with the abovementioned front and rear wheel rotation frequency measuring devices and the vehicle orientation measured with the abovementioned gyro. The current speed v of the vehicle 30 is measured by sequential measurement of the current positions.

The superior controller 34 and subordinate controller 33 are controllers for controlling the travel of a particular vehicle 30 along the travel route.

The superior controller 34 comprises a course data storage device 34a for storing the travel route that the vehicle 30 should travel as a sequence of point data (course data). In other words, the travel route is represented as a series of points showing each point P1, P2, ... Pn on the travel route. The x-y coordinates (x, y), direction angle θ of the vehicle 30, and the travel speed v of the vehicle 30 are correlated to each point P1, P2, ... Pn and the course data P1 (X1, Y1, θ1, v1), P2 (X1, Y1, θ2, v2), ... Pn (Xn, Yn, θn, vn) are constituted thereby.

The obstacle detecting sensor 35 is a sensor for detecting obstacles on the travel route of the unmanned vehicle 30.

The superior controller 34 performs wireless communication outside of the system. Also, a certain quantity of course data previously sent from the monitor station 20 is retained in the superior controller 34. The superior controller 34 then selects the course data according to the target position sent from the monitor station 20 and the travel path.

When the superior controller 34 does not retain the course data corresponding to the indicated travel path, or when checksum of the retained course data is different from the indicated contents, the superior controller 34 requests transmission of course data from the monitor station 20.

Based on the current position of the unmanned vehicle 30 and the course data, the superior controller 34 generates travel data for traveling only a prescribed distance (about 200 m) within the indicated authorized travel region and then stopping. This travel data is generated periodically (every second) according to changes in the current position and is sent to the subordinate controller 33 via a vehicle LAN (Local Area Network).

The subordinate controller 33 controls the steering, acceleration, and braking based on the abovementioned travel data and controls the traveling of the vehicle 30.

The relationship between the superior controller 34 and subordinate controller 33 is explained here.

In other words, the travel data are course data for a portion (distance L is about 200 m) of the travel route ordered by the monitor station 20. The vehicle 30 travels without stopping along the travel route, formed by linking the continuously transmitted travel data, so long as the travel data are continuously sent from the superior controller 34 to the subordinate controller 33. When the transmission from the superior controller 34 to the subordinate controller 33 is interrupted, the vehicle 30 stops at the end point of the travel route corresponding to the travel data last provided to the subordinate controller 33 because new travel data must be provided to the subordinate controller 33. In effect, the vehicle 30 cannot advance beyond the travel route corresponding to the travel data provided to the subordinate controller 33.

If the target position is changed in the monitor station 20, course data showing the new travel route are indicated. At this time, if the new post-change travel route is a travel route preceding the travel route corresponding to the travel data already provided by the superior controller 34 to the subordinate controller 33, the superior controller 34 can generate travel data corresponding to the new travel route, provide this to the subordinate controller 33, and cause the vehicle 30 to travel along the new, post-change travel route. However, if the new, post-change travel route is the travel route on the near side of the travel route corresponding to the travel data already provided by the superior controller 34 to the subordinate controller 33, it cannot be changed to the new travel route.

Figure 9A:
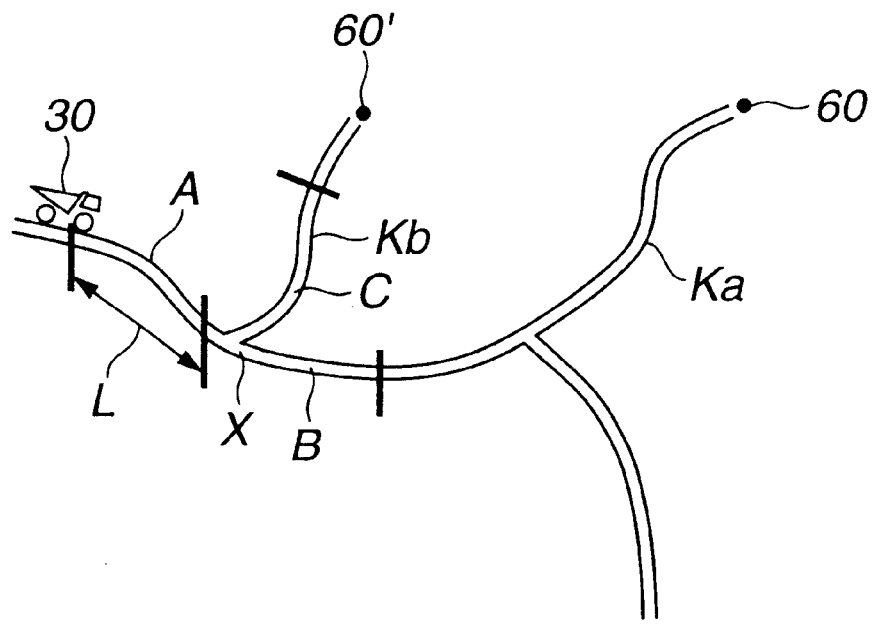
FIGS. 9(a) and 9(b) are drawings showing the situation wherein a vehicle is traveling close to an intersection.
Figure 9B:
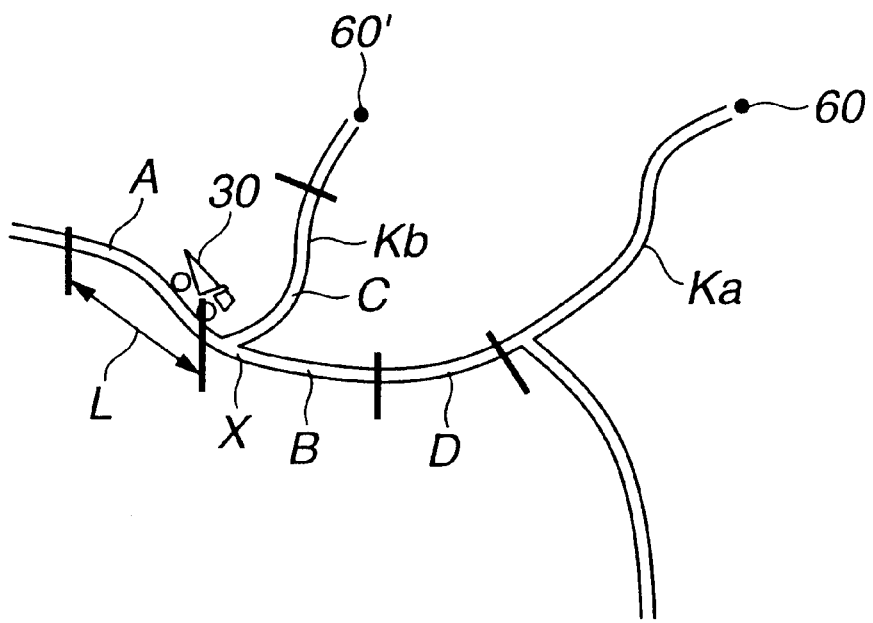

This is explained with reference to FIGS. 9(a) and 9(b). In FIGS. 9(a) and 9(b), A, B, and C represent travel data for the distance L.

The unmanned vehicle 30 is now traveling along the scheduled travel route Ka. At this point, the target position changes in the monitor station 20 and course data showing a new travel route Kb intersecting at intersection X with the scheduled travel route Ka are indicated. At this time, when there is a long distance between the current position of the vehicle to the intersection X as shown in FIG. 9(a), travel data corresponding to the post-change travel route C can be generated, provided to the subordinate controller 33, and cause the vehicle 30 to travel along the post-change travel route C FIG. 9(a)). This is because the post-change travel route C including the intersection X (part of the travel route Kb) is a travel route preceding the travel route A that does not include the intersection X and is already provided by the superior controller 34 to the subordinate controller 33. On the other hand, when there is a short distance between the current position of the vehicle 30 at the intersection X as shown in FIG. 9(b), the travel route cannot be changed from B to C. This is because the post-change travel route C including the intersection X is a travel route on the near side of the travel route B including the intersection X that is already provided by the superior controller 34 to the subordinate controller 33.

When an order to turn off at the intersection X is provided from the monitor station 20, it is determined in the superior controller 34 whether it is possible to turn at the intersection X and change to the new travel route C according to whether the travel data for the travel route B including the intersection X are already provided to the subordinate controller 33. For example, it is determined whether the vehicle can turn off at the intersection X and change to the new travel route C according to whether the distance from the current position of the vehicle 30 to the intersection X is greater than or equal to a prescribed threshold value. Moreover, this determination may also be processed on the monitor station 20 side and the results provided via the communication device to the vehicle.

The subordinate controller 33 determines whether an obstacle detected by the obstacle detecting sensor 35 is on the travel route based on the travel data and data regarding the current position, orientation, and inclination of the unmanned vehicle 30.

In the vehicle control system 36, the steering angle, braking, transmission, end engine speed are controlled by the subordinate controller 33.

The constitution of the manned vehicles 40 relating to the present embodiment is explained next.

Figure 4:
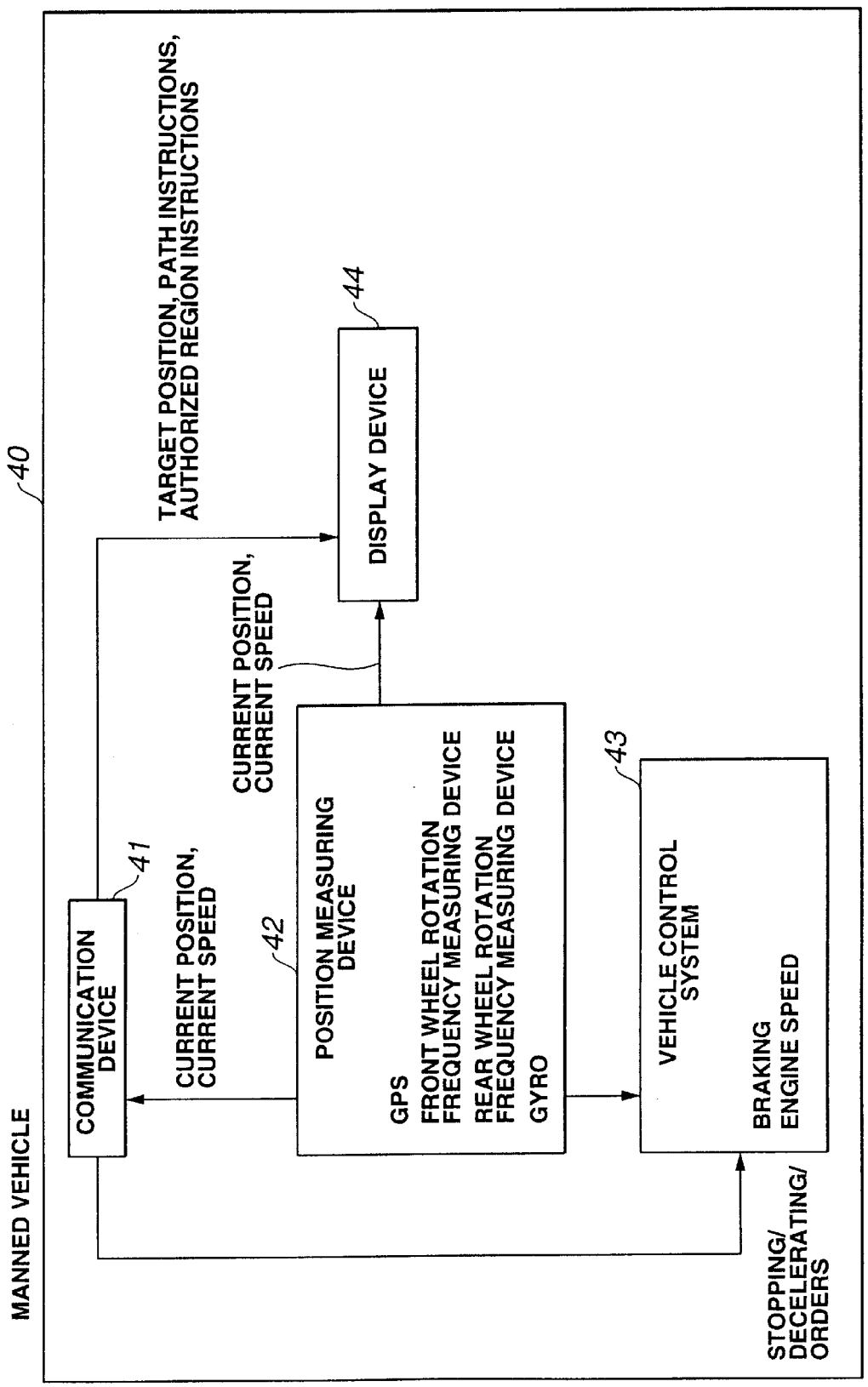
FIG. 4 is a functional block diagram of a manned vehicle.

FIG. 4 is a functional block diagram showing the constitution of the manned vehicles 40 relating to the present embodiment.

As shown in FIG. 4, the manned vehicle 40 comprises a communication device 41, a position measuring device 42, a vehicle control system 43, and a display device 44.

The communication device 41 is provided the same functions as the communication device 31 on the unmanned vehicle 30. The position measuring device 42 is also constituted in the same way as the position measuring device 32 on the unmanned vehicle 30.

In the vehicle control system 43, braking, engine speed, and so forth are driven and controlled according to operations by the operator.

The current position and current speed of the manned vehicle 40 are displayed on the display device 44.

The constitution of the hoppers 50, 50' relating to the present environment are explained next.

Figure 5:
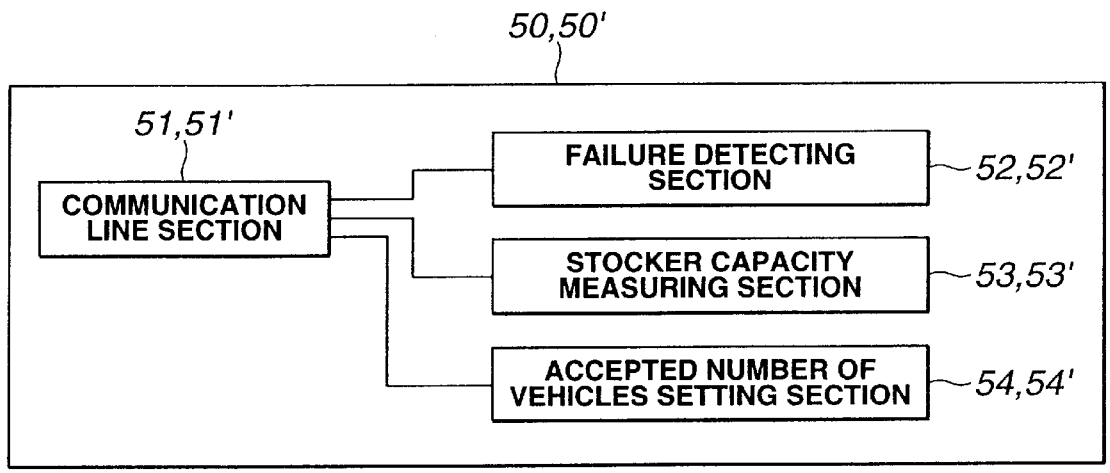
FIG. 5 is a functional block diagram of a hopper.

FIG. 5 is a functional block diagram showing the constitution of the hoppers 50, 50' relating to the present embodiment.

As shown in FIG. 5, the hoppers 50, 50' comprise a communication line section 51, 51', a failure detecting section 52, 52', and a stocker capacity setting section 53, 53'.

The failures of the hoppers 50, 50' are detected by the failure detecting section 52, 52'. Moreover, in addition to mechanical failures, failures of the hoppers 50, 50' include all situations when the hoppers 50, 50' have temporarily stopped work. Also, the stocker capacity of the hoppers 50, 50' is measured by the stocker capacity measuring section 53, 53'.

In the accepted number of vehicles setting section 54, 54', the number of vehicles for which unloading work can be finished per unit time by the hoppers 50, 50' is established based on the cycle time of the hoppers 50, 50'. The cycle time is found by measuring the time from when a vehicle arrives at the earth removal site 60a, 60a' until the unloading work is finished and the operator has instructed the vehicle to depart.

In the communication line section 51, 51', data showing the current status of the hoppers 50, 50' are transmitted over the line to the monitor station 20. These data include the failure of the hoppers 50, 50' detected by the failure detecting section 52, 52', stocker capacity of the hoppers 50, 50' measured by the stocker capacity measuring section 53, 53', and the accepted number of vehicles established by the accepted number of vehicles setting section 54, 54'.

The constitution of the loaders 60, 60' relating to the present embodiment is explained next.

Figure 6:
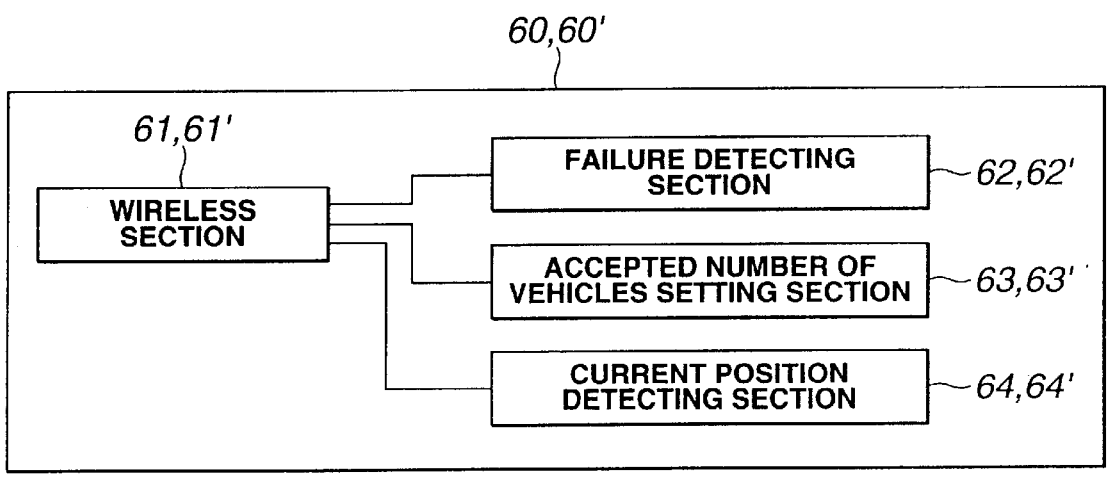
FIG. 6 is a functional block diagram of a loader.

FIG. 6 is a functional block diagram showing the constitution of the loaders 60, 60' relating to the present embodiment.

As shown in FIG. 6, the loaders 60, 60' comprise a wireless section 61, 61', a failure detecting section 62, 62', an accepted number of vehicles setting section 63, 63', and a current position detecting section 64, 64'.

Failures of the loaders 60, 60' are detected in the failure detecting section 62, 62'. Moreover, the failures of the loaders 60, 60' include mechanical failures, and all situations when the loaders 60, 60' temporarily stop working due to the operator taking a break, or the like.

In the accepted number of vehicles setting section 63, 63', the number of vehicles that can be accepted by the loaders 60, 60' and for which the loading work can be completed per unit time is established based on the cycle time of the loaders 60, 60'. The cycle time is found by measuring the time from when a vehicle arrives at the loading site 60a, 60a' until the loading work is complete and operator has instructed the vehicle to depart.

The current positions of the loaders 60, 60' are detected by the current position detecting section 64, 64'.

Data indicating the current status of the loaders 60, 60' are transmitted to the monitor station 20 over the lines in the wireless sections 61, 61'. These data include failures of the loaders 60, 60' detected by the failure detecting section 62, 62', the accepted number of vehicles set in the accepted number of vehicles setting sections 63, 63', and the current position of the loaders 60, 60' detected by the current position detecting sections 64, 64'.

The embodiment that can change the target position for each vehicle in order to maximize working efficiency, based on the current status of the hoppers 50, 50' and the current positions of the vehicles 30, 30', 40, is explained below with reference to FIG. 7.

Figure 7:
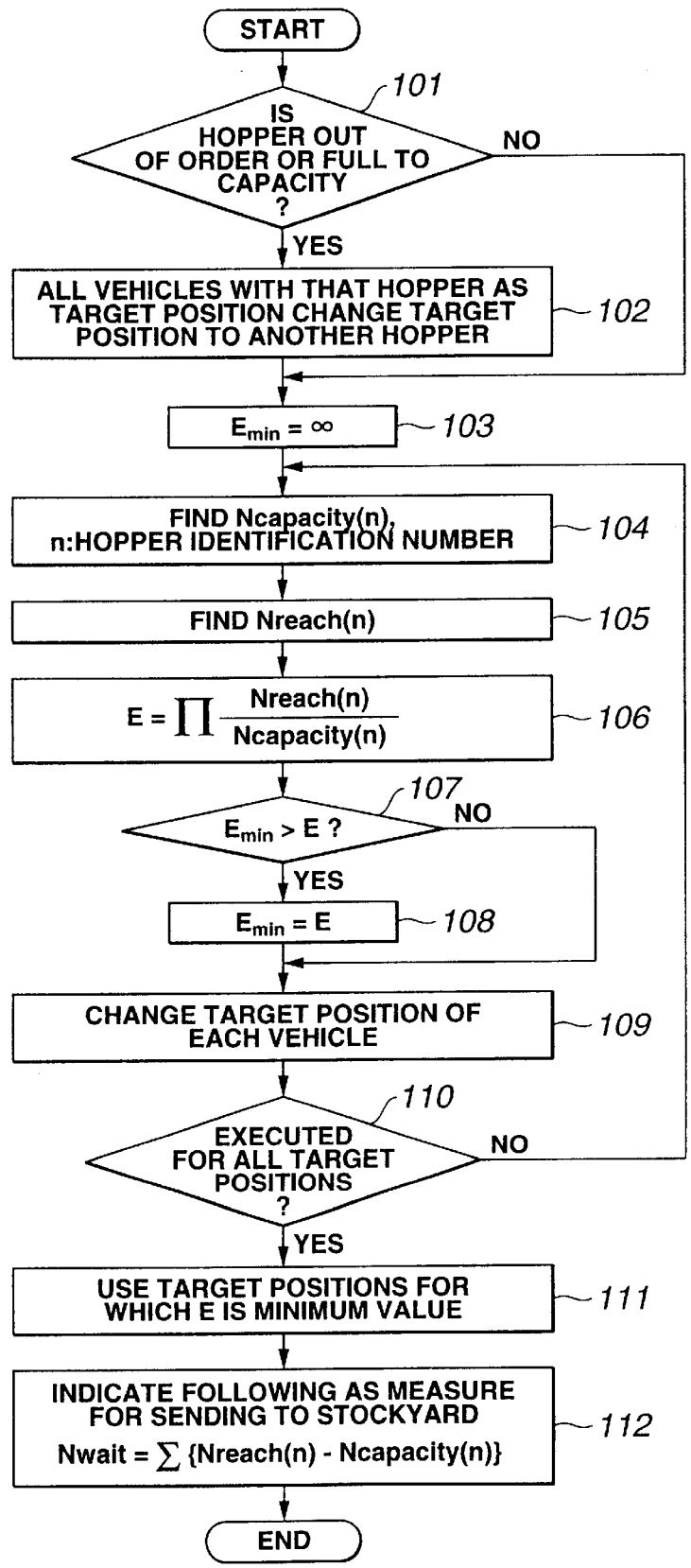
FIG. 7 is a flowchart showing the processing procedures for an embodiment.

FIG. 7 is a flowchart showing the process for changing the target positions of the vehicles 30, 30', 40 that are traveling with their target position being the hoppers 50, 50' as shown in FIG. 1(a).

In the monitor station 20, processing for changing the target position is carried out in order to even out the loads on the hoppers 50, 50' and maximize working efficiency.

Based on data indicating failure of the hoppers 50, 50' and data indicating the stocker capacity sent from the hoppers 50, 50', it is determined whether the hoppers 50, 50' are out of order or whether the hoppers 50, 50' are full to capacity (Step 101).

For example, when, of the two hoppers 50, 50', the hopper 50 is out of order or full to capacity (Yes in Step 101), the target position of all vehicles traveling with the hopper 50 as their target position is changed to the other hopper 50' (Step 102).

Also, when neither of the hoppers 50, 50' is out of order or full to capacity (No in Step 101), the processing skips Step 102 and moves to Step 103.

In Step 103, the variable Emin is set to infinity ∞ (Step 103). Next, based on the cycle time of each hopper 50, 50', the number of vehicles that can be accepted by the hoppers 50, 50' per unit time Ncapacity (n) is found for each hopper identification number n. The accepted number of vehicles Ncapacity (n) is set by the hoppers 50, 50' as shown in FIG. 5, but may also be set by the monitor station 20 (Step 104).

Next, based on the current positions of the vehicles 30, 30', 40 and the travel routes to the target positions of the vehicles 30, 30', 40, the number of vehicles Nreach (n) arriving at the target position within a unit time from the current time is found for each target position n (hopper identification number n) (Step 105).

Next, the ratio of the number of vehicles arriving Nreach (n) to the number of vehicles accepted Ncapacity (n), Nreach (n)/Ncapacity (n), for each hopper is found. A value E, the product of these for all hoppers n, is found as in the following equation (1).

$$E = \Pi\{Nreach(n)/Ncapacity(n)\} \quad (1)$$

Π is an operating symbol showing the product for all n (Step 106).

When the E is found in this way is less than the abovementioned Emin (Yes in Step 107), the processing moves to Step 108 and Emin is set to E (Step 108). Also, when the E is greater than or equal to Emin (No in Step 107), the processing skips Step 108 and moves to Step 109.

In Step 109, processing for changing the target positions of the vehicles 30, 30', 40, in effect processing to change the correlation between the vehicles 30, 30', 40 and the target positions, is executed (Step 109). Once the target positions of the vehicles 30, 30', 40 are changed, processing to find E is executed in the same way (Step 104 to Step 108).

When the changing of the correlations between each vehicle 30, 30', 40 and the target position could not be completed for all (No in Step 110), the processing in Step 104 to Step 110 is repeated. When the changing of the correlations between each vehicle 30, 30', 40 and the target position could be completed for all (No in Step 110), the current Emin is determined to be the minimum value of the variable E and the correlation between the vehicles 30, 30', 40 and the target position resulting in the minimum value E is ultimately employed. In this way, the target position for each vehicle 30, 30', 40 that results in an even load between the hoppers 50, 50' and maximizes working efficiency is determined (Step 111).

Next, the number of vehicles waiting after the unit time (Nreach (n)−Ncapacity (n)) is found for each hopper n. The total number of vehicles waiting Nwait is found as in the following equation (2)

$$Nwait = \Sigma\{Nreach(n) - Ncapacity(n)\} \quad (2)$$

The total value Nwait is the number of vehicles waiting at all hoppers 50, 50' after a unit time from the current time. Consequently, the number of vehicles waiting Nwait becomes the benchmark for allocating vehicles to the stockyard 14. This number of vehicles waiting Nwait is displayed on the prescribed display screen of the monitor station 20. When the stockyard 14 is used, the operator of the monitor station 20 looks at the display screen and decides the number of vehicles to allocate to the stockyard 14. As discussed above, the amount of ore already in the stockyard 14, and the amount of stock that can from this point be put in the stockyard 14 are controlled in the monitor station 20. The number of vehicles that can be headed for the stockyard 14 is set from the amount of stock that can be put in the stockyard 14. Accordingly, this set number of vehicles is compared to the abovementioned number of waiting vehicles Nwait and the vehicles having the stockyard 14 as their target position can be determined within the range of the set number of vehicles. Also, the number of vehicles having the stockyard 14 as their target position may also be calculated automatically and without entrusting the decision to the operator.

In the present embodiment, the vehicles 30, 30', 40 carrying the same type of ore are allocated among the hoppers 50, 50', and the stockyard 14. However, when the hoppers 50, 50' are processing different types of ore and the vehicles are carrying different types of ore, a constraint on the type of hopper which the vehicles 30, 30', 40 should have as their target position may be added. Also, when the stockyard 14 is not employed, the processing in the abovementioned Step 112 may be omitted.

When the target positions toward which the vehicles and 30, 30', 40 should travel are determined as above, the travel routes are generated; these travel routes will allow the vehicles 30, 30', 42 to travel to the target positions in the shortest time from their current positions. Then, travel instructions that will cause the vehicles 30, 30', 40 to follow the travel routes generated are sent by the communication device 21 from the monitor station 20. Specifically, the travel route is indicated to the vehicles 30, 30', 40 as an authorized travel region. When the travel commands are received by the vehicles 30, 30', 40, the vehicles can travel from their current positions to the target positions along the travel routes provided by the travel commands.

For example, when the hopper 50 in the earth removal site 50a is out of order in FIG. 1(a), the travel position toward which the unmanned vehicle 30, traveling with the hopper 50 as its target position, should travel is changed from the hopper 50 to the hopper 50' in another earth removal site 50a'. The unmanned vehicle 30 can thereby travel from its current position to the hopper 50'; moreover, data for the travel route K for traveling to the hopper 50' in the shortest time are generated by the monitor station 20 and the data for this travel route K are provided to the unmanned vehicle 30 from the monitor station 20. The travel routes that the unmanned vehicle 30 can follow from its current position to the hopper 50' include K and K', but the shortest path K is selected. When the data for the travel route K are provided from the monitor station 20, the unmanned vehicle 30 travels along the provided travel route K from its current position to the target position of 50'.

Next, the embodiment for changing the target positions of each vehicle in order to maximize working efficiency, based on the current status of the loaders 60, 60' and the current positions of the vehicles 30, 30', 40, is explained with reference to FIG. 8.

Figure 8:
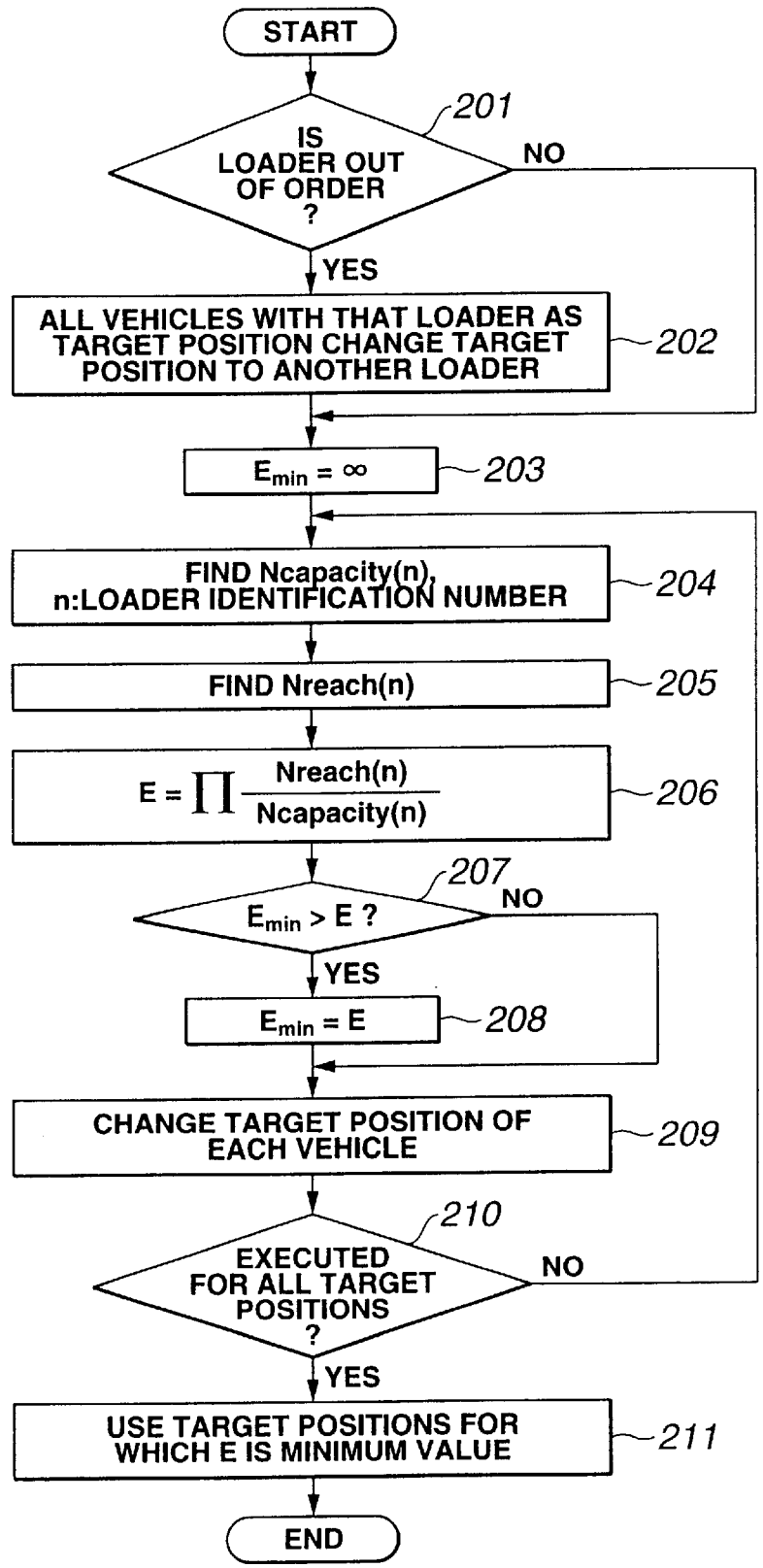
FIG. 8 is a flowchart showing the processing procedures for an embodiment.

FIG. 8 is a flowchart showing the processing for changing the target positions of vehicles 30, 30', 40 traveling with the loaders 60, 60' as their target positions as shown in FIG. 1(b).

Processing for changing the target positions in order to even out the loads on the loaders 60, 60' and to maximize the working efficiency is performed in the monitor station 20.

It is determined whether the loaders 60, 60' are out of order based on data indicating the failure status of the loaders 60, 60' sent from the loaders 60, 60' (Step 201).

For example, when, of the loaders 60, 60', the loader 60 is out of order (Yes in Step 201), the target positions of all vehicles traveling with that loader 60 as their target position are changed to the other loader 60' (Step 202).

When the loaders 60, 60' are not out of order (No in Step 201), the processing skips Step 202 and moves to Step 203.

In Step 203, the variable Emin is set to infinity ∞ (Step 203). Next, the number of vehicles that the loaders 60, 60' can accept in a unit time Ncapacity (n) is found for each loader identification number n based on the cycle time of the loaders 60, 60'. The number of vehicles accepted Ncapacity (n) is set by the loaders 60, 60' as shown in FIG. 6, but may also be set by the monitor station 20 (Step 204).

Next, the number of vehicles arriving at the target position within a unit time from the current time Nreach (n) is found for each target position n (loader identification number n) based on the current positions of the vehicles 30, 30', 40 and the travel routes of the vehicles 30, 30', 40 to the target positions (Step 205).

Next, the ratio of the number of vehicles arriving Nreach (n) to the number of vehicles accepted Ncapacity (n), Nreach (n)/Ncapacity (n), is found for each loader n. A value E, the product of these for all loaders n, is found as in equation (1)(E=Π{Nreach(n)/Ncapacity(n)}) (Step 206).

When the E is found in this way is less than the above-mentioned Emin (Yes in Step 207), the processing moves to Step 208 and Emin is set to E (Step 208). Also, when the E is greater than or equal to Emin (No in Step 207), the processing skips Step 208 and moves to Step 209.

In Step 209, processing for changing the target positions of the vehicles 30, 30', 40, in effect processing to change the correlation between the vehicles 30, 30', 40 and the target positions, is executed (Step 209). Once the target positions of the vehicles 30, 30', 40 are changed, processing to find E is executed in the same way (Step 204 to Step 208).

When the changing of the correlations between each vehicle 30, 30', 40 and the target positions could not be completed for all (No in Step 210), the processing in Step 204 to Step 210 is repeated. When the changing of the correlations between each vehicle 30, 30', 40 and the target position could be completed (No in Step 210), the current Emin is determined to be the minimum value of the variable E and the correlation between the vehicles 30, 30', 40 and the target position resulting in the minimum value E is ultimately employed. In this way, the target position for each vehicle 30, 30', 40 that results in an even load between the loaders 60, 60' and maximizes working efficiency is determined (Step 211).

Moreover, in the case of loading ore at the stockyard 14, the stockyard 14 may be added to the loaders 50, 50' as a target position and the processing in steps 201 to 211 discussed above may be performed. As discussed above, the amount of ore already in the stockyard 14 is managed in the monitor station 20. Accordingly, the amount of ore already present can be used to determine whether loading work should be performed with the stockyard 14 as a target position.

In the present embodiment, the vehicles 30, 30', 40, carrying the same type of ore, are allocated among the loaders 60, 60' and the stockyard 14. However, when the loaders 60, 60', and the stockyard 14 are all handling different types of ore, or each vehicle is carrying a different type of ore, a constraint may be added to the loaders 60, 60', and stockyard 14, toward which the vehicles 30, 30', and 40 should travel as a target position.

When the target positions toward which the vehicles 30, 30', 40 should travel are determined as above, travel routes are generated that allow the vehicles 30, 30', and 40 to travel from their current position to the target position in the shortest time. Because the loaders 60, 60' are traveling within the loading sites 60*a*, 60*a*' in this case, the travel routes between the current positions of the vehicles and the current positions of the loaders are generated based on the current position data and sent from the loaders 60, 60'. Travel orders commanding the vehicles to travel along the travel routes generated are then sent from the monitor station 20 to the vehicles 30, 30', 40 by the communication device 21. Specifically, the travel route is indicated to the vehicles 30, 30', 40 as an authorized travel region. When the travel orders are received by the vehicles 30, 30', 40, the vehicles can travel from their current positions to the target positions along the travel routes provided by the travel orders.

For example, when the loader 60 in the loading site 60*a* temporarily stops working because the operator is taking a break as in FIG. 1(*b*), the target position toward which the unmanned vehicle 30, that is traveling with the loader 60 as its current target position, should travel is changed from the loader 60 to the loader 60' in the other loading site 60*a*'. The unmanned vehicle 30 can thereby travel from its current position to the loader 60'. Moreover, data for the travel route K, allowing travel to the loader 60' in the shortest time, are generated in the monitor station 20; the data for this travel route K are provided from the monitor station 20 to the unmanned vehicle 30. Upon receiving the data for the travel route K from the monitor station 20, the unmanned vehicle 30 travels along the travel route K provided from its current position to the target position 60'.

FIG. 7 shows a hypothetical situation wherein the vehicles 30, 30', 40 have only hoppers as target positions. FIG. 8 shows a hypothetical situation wherein the vehicles 30, 30', 40 have only loaders as target positions. However, the present invention can also apply to the case where the vehicles 30, 30', 40 have both hoppers and loaders as target positions. In other words, the target positions of the vehicles 30, 30', 40 can be determined in the same way so as to maximize working efficiency.

With the present embodiment, as above, the travel routes of the vehicles 30, 30', 40 can be changed and the vehicles 30, 30', 40 can be caused to travel along the changed travel routes at the time when a failure or the like occurs at a target position and it becomes necessary to change the travel routes of the vehicles 30, 30', 40. It is not necessary, as in the conventional art, for the vehicles 30, 30', 40 to travel to a worksite where work is temporarily interrupted and wait. The travel routes can be changed while the vehicles 30, 30', 40 are traveling. For this reason, working efficiency can be improved while wasteful activity of the vehicles 30, 30', 40 is eliminated. Furthermore, working efficiency is still further improved because the target positions can be changed so as to even out the load among the worksites.

Following is an explanation of processing for the case where instructions to change the travel route are provided near an intersection with this scheduled travel route, in the case where data for a scheduled travel route are provided from the monitor station 20 to the vehicle 30 and the vehicle 30 is traveling along the scheduled travel route. The explanation below uses the unmanned vehicle 30. However, this embodiment can also be applied to a manned vehicle 40.

Figure 10:
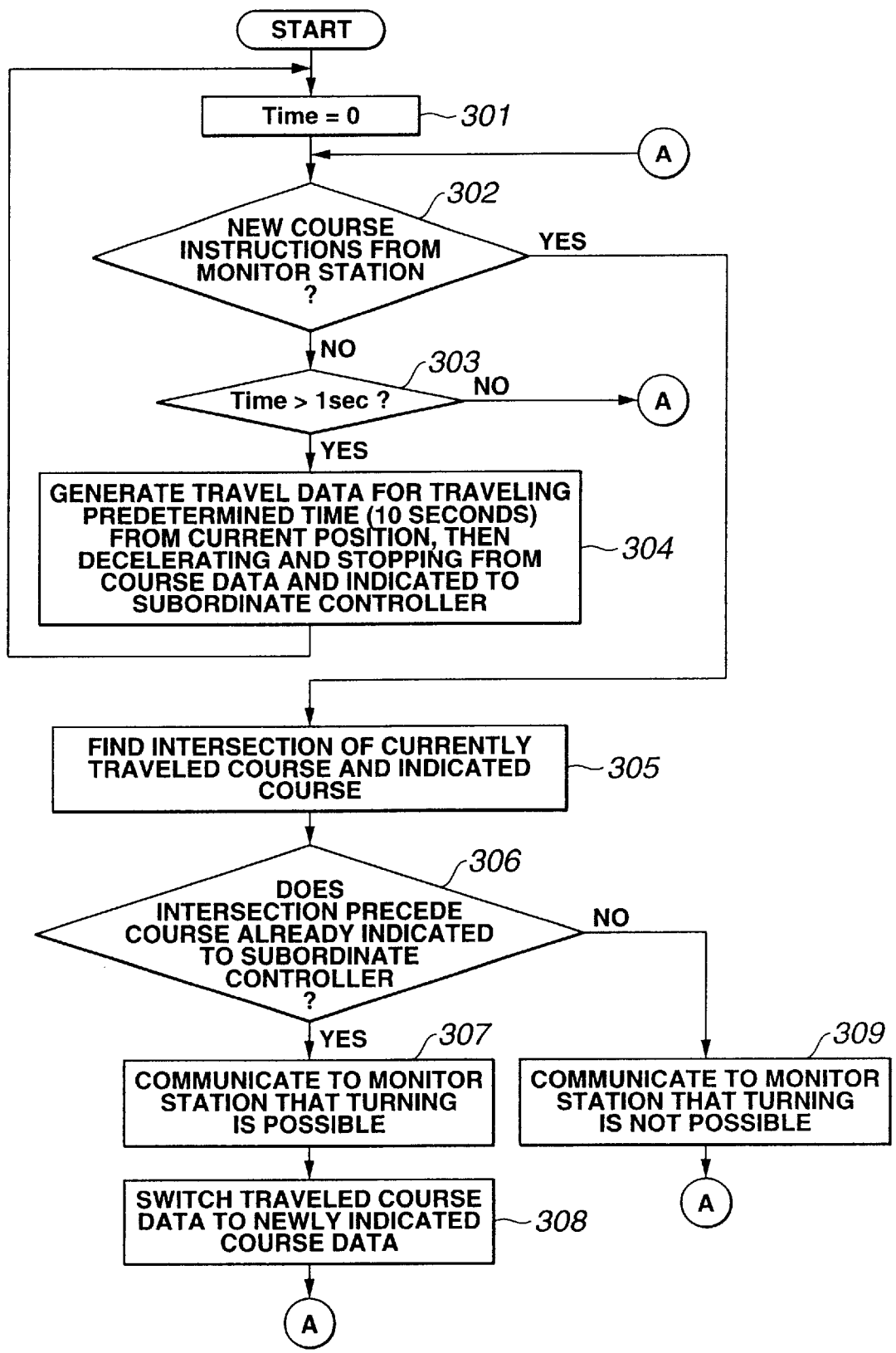
FIG. 10 is a flowchart showing the processing procedures for an embodiment.

FIG. 10 is a flowchart showing the processing procedures executed in the superior controller 34 of the unmanned vehicle 30. This will be explained with reference to FIGS. 9(*a*) and 9(*b*) as well.

Presently the unmanned vehicle 30 is traveling along the scheduled travel route Ka as shown in FIGS. 9(*a*) and 9(*b*).

The time Time of the timer for measuring the time interval in which travel data are initially generated is set to zero (Step 301). Next, the target position is changed in the monitor station 20 and it is determined whether travel orders to follow the travel route Kb have been provided (Step 302).

So long as the time Time measured by the timer has not reached the travel data generation interval (one second) (No in Step 303), the processing for Steps 302 and 303 is repeated.

On the other hand, when the time Time measured by the timer has reached the travel data generation interval (one second) (Yes in Step 303), travel data for a portion of the scheduled travel route Ka are generated (data for traveling 10 seconds from the current position of the vehicle 30, decelerating, and stopping wherein the distance L is 200 m) based on course data for the scheduled travel route Ka. This travel data is then sent to the subordinate controller 33. The unmanned vehicle 30 thereby travels along the scheduled travel route Ka (Step 304).

In Step 302, the target position is changed in the monitor station 20 from the current loader 60 to another loader 60'. In the case where travel orders to travel along the travel route Kb to this new target position 60' are provided (Yes in Step 302), the procedure moves to Step 305.

In Step 305, the intersection X of the scheduled travel route Ka that is currently followed and the newly ordered travel route Kb is found (Step 305).

Next, it is determined whether the intersection X precedes the portion corresponding to the travel data already provided to the subordinate controller 33 (Step 306).

In the case where the intersection X is ahead of the section A corresponding to the travel data already provided to the subordinate controller 33 (when the intersection X is included in the preceding section B) as shown in FIG. 9(*a*), it is determined whether the vehicle can safely in navigate the curve without leaving the course (Yes in Step 306), even when the distance from the current position of the vehicle 30 to the intersection X is long and the vehicle 30 turns from the scheduled travel route Ka at the intersection X onto the new travel route Kb. A message to the effect that it is possible to turn at the intersection X and switch to the travel route Kb is sent by the communication device 31 to the monitor station 20 (Step 307).

Next, course data are switched from the scheduled travel route Ka to the new travel route Kb in the superior controller 34 (Step 308).

When the time Time measured by the timer reaches the travel data generation interval (one second) (Yes in Step 303), travel data for the section C of the new travel route Kb are generated on the basis of the course data for the new travel route Kb. These course data are then sent to the subordinate controller 33. The unmanned vehicle 30 thereby travels along a travel route C. In effect, the unmanned vehicle 30 can safely turn at the intersection X with the scheduled travel route Ka and switch to the new travel route Kb (Step 304: see FIG. 9(*a*)). After that, travel data for each portion of the new travel route Kb are sequentially generated every travel data generation interval (one second) by the repetition of the processing in steps 303 and 304, and the unmanned vehicle 30 thereby travels along the new travel route Kb and arrives at the post-change target position 60'.

On the other hand, when the intersection X does not precede the section B corresponding to be the travel data already provided to the subordinate controller 33 (when the intersection X is not included in the already provided section B) as shown in FIG. 9(*b*), it is determined that there is some risk of leaving the course when turning from the scheduled travel route Ka to the new travel route Kb and the curve cannot be safely navigated (No in Step 306) when the distance from the current position of the vehicle 30 to the intersection X is extremely short. A message to the effect that it is not possible to turn at the intersection X and switch to the new travel route Kb is sent to the monitor station 20 by the communication device 31 (Step 309).

When the time Time measured by the timer reaches the travel data generation interval (one second) (Yes in Step 303), travel data for the next section D in the scheduled travel route Ka are generated on the basis of the course data for the scheduled travel route Kb currently being followed. These travel data are then sent to the subordinate controller 33. The unmanned vehicle 30 thereby travels the travel route D. In effect, the unmanned vehicle 30 continues traveling along the scheduled travel route Ka (Step 304: see FIG. 9(*b*)). After that, travel data for each portion of the scheduled travel route Ka are sequentially generated every travel data generation interval (one second) by the repetition of the processing in steps 303 and 304. The unmanned vehicle 30 thereby travels along the scheduled travel route Ka and arrives at the target position 60.

According to the present embodiment as above, it is possible to definitely select the travel route for which there is no possibility of departing from the travel route, even in the case where travel instructions to turn at the intersection X with the scheduled travel route Ka are provided from the monitor station 20. For this reason, departure from the travel route is definitely prevented and major accidents such as collisions with other vehicles, overturning, and landslides are avoided.

Moreover, in the present embodiment, the determination of whether it is possible to turn is made on the unmanned vehicle 30; however, this determination may also be made in the monitor station 20 and the results provided to the unmanned vehicle 30.

However, depending on the worksite, a plurality of vehicles 40, 30', 30 may be traveling sequentially to the same target position (for example, the loader 60) and performing work sequentially (loading work). When the first vehicle 40 is engaged in work at this time, the following vehicles 30', 30 have to wait to begin work. In the embodiment explained next, working efficiency can be maximized and the operating costs of the vehicles minimized by optimizing this waiting time.

Figure 11A:
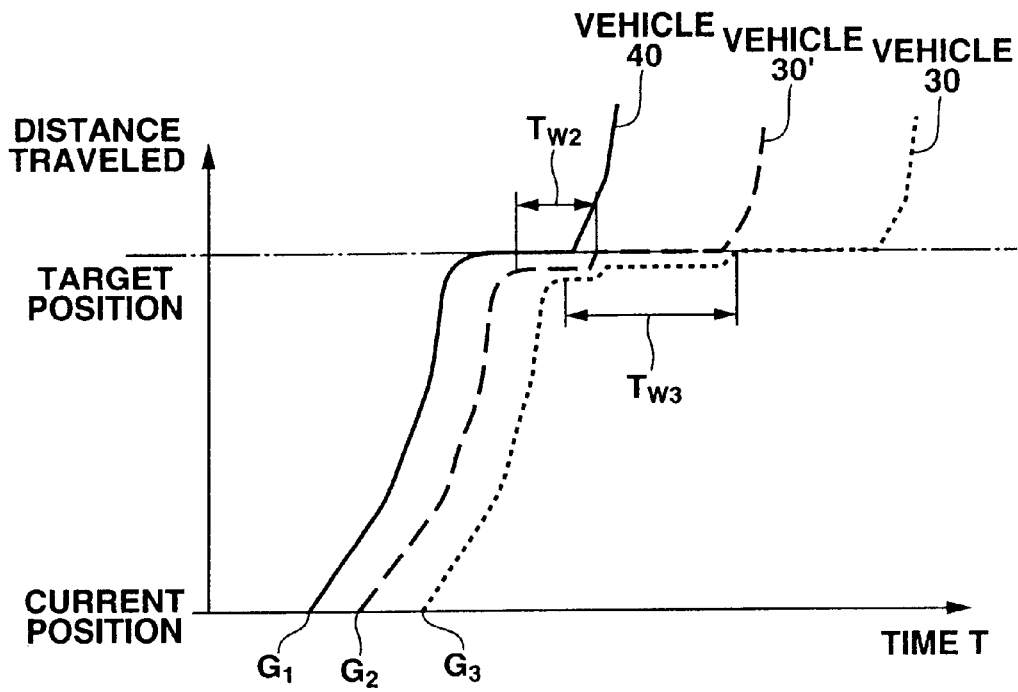
FIGS. 11(a) and 11(b) are drawings to explain the situation where a vehicle arrives at a target position from the current position.

FIG. 11(*a*) shows a case where the following vehicles 30', 30 are traveling at high speeds toward a target position (for example, loader 60) from their current positions G2, G3. The horizontal axis shows time T and the vertical axis shows the distance traveled. The vehicle 30' must wait for a waiting time Tw2 from arriving at the loading site 60*a* until the preceding vehicle 40 finishes its loading work. Also, the next following vehicle 30 must wait for a waiting time Tw3, after arriving at the loading site 60*a*, until the preceding vehicles 40, 30' finish their loading work.

In the monitor station 30, the arrival order Norder for arrival at the target position 60 and the estimated arrival time Treach for arriving at the target position 60 from the current positions G1, G2, G3 are found for each vehicle 40, 30', 30 based on the relative positions of the current positions G1, G2, G3 of the plurality of vehicles 40, 30', 30 and the target position 60, and the vehicle speed v.

The estimated waiting time Twait until loading work can begin is calculated with the equation 3 below for each of the following vehicles 30', 30 on the basis of the arrival order Norder, the estimated arrival time Treach, and the working time (cycle time) Ts for one vehicle at the target position 60.

$$Twait = Ts \cdot (Norder - 1) + T0 - Treach \qquad (3)$$

In the equation 3, T0 is the time at which the loader 60 can accept the next vehicle. When the value for the estimated waiting time Twait becomes negative in the equation 3, this means that the loader 60 is waiting. When the estimated waiting time Twait becomes positive, this means that the vehicle is waiting. The estimated waiting times Tw2, Tw3 for the following vehicles 30', 30 are found in this way (see FIG. 11(*a*)).

In order to avoid increasing the operating costs (tires and so forth) for the vehicles 30', 30, it was thought to set a low traveling speed v for the vehicles 30', 30. However, when the traveling speed v of the vehicles 30', 30 is extremely low, the arrival time Treach required to arrive at the loader 60 becomes very long; the preceding vehicle 40 and so forth will have already finished loading work and some time will have passed until the loading work begins. For this reason, wasted time when loading work is not being performed at the loading site 60a will occur. Working efficiency will consequently be reduced by decreasing the speed of all the vehicles in combination with the occurrence of this wasted time.

The optimum waiting time Tbestwait, taking into account control errors and communication delays, is found with equation (4) below. Furthermore, the optimum arrival time Tbestreach corresponding to this optimum waiting time Tbestwait is found with equation (5) below. If the speed v is changed for arrival at the loaders 60 in this optimum arrival time Tbestreach and the vehicles 30', 30 are caused in that order to travel at this changed speed, the vehicles can begin the loading work in the abovementioned optimum waiting time Tbestwait. It thereby becomes possible to maximize working efficiency while minimizing the operating costs of the vehicles 30', 30.

$$Tbestwait = Ts \cdot (Norder - 1) + T0 - Tbestreach \tag{4}$$

$$Tbestreach = Ts \cdot (Norder - 1) + T0 - Tbestwait \tag{5}$$

Figure 11B:
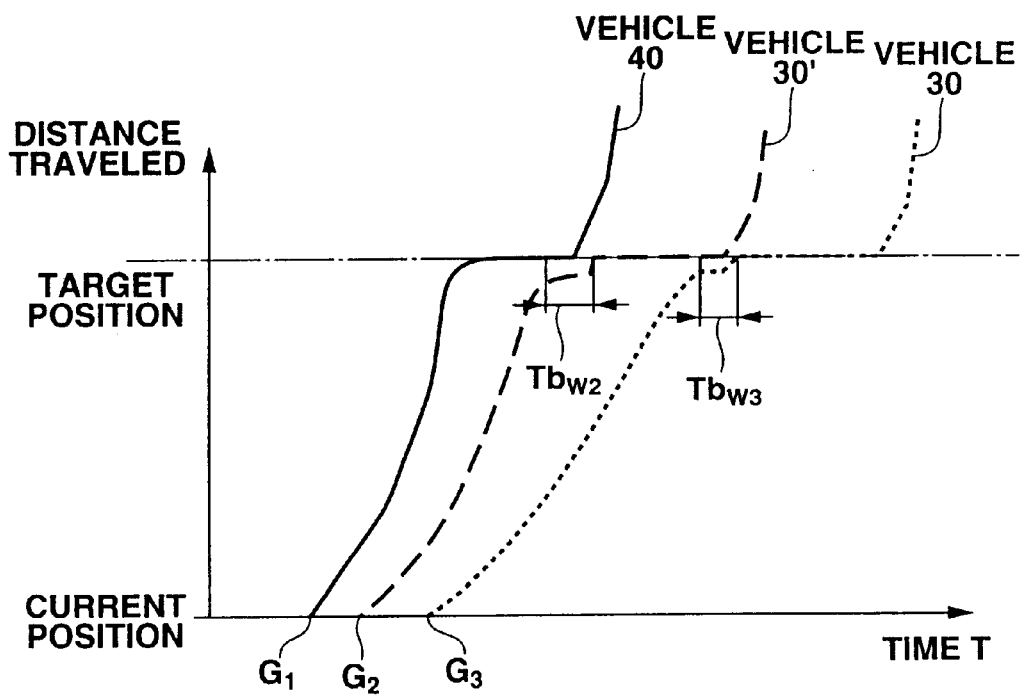

The optimum waiting times Tbw2, Tbw3 for the following vehicles 30', 30 are found in this way, as are the optimum arrival times Tbr2, Thr3 (see FIG. 11(b)).

Next, as shown in the following equation (6), the constant ratio Treach/Tbestreach is multiplied by the speed v currently set for the vehicles 30', 30 and the optimum speed vb is found.

$$vb = (Treach/Tbestreach) \cdot v \tag{6}$$

If the set speed of the vehicles 30', 30 is v and the estimated arrival time Treach is Tr2 and Tr3 respectively, the optimum speeds vb2, vb3 of the vehicles 30', 30 become (Tr2/Tbr2)·v and (Tr3/Tbr3)·v.

Next, data showing the optimum speeds vb2, vb3 for the vehicles 30', 30 are sent to each vehicle by the communication device 21. In the vehicles 30', 30, the current speed v is updated by the optimum speeds vb2, vb3 received. In other words, the contents of the speed data v in the course data P1 (X1, Y1, θ1, v1), P2 (X1, Y1, θ2, v2) ... Pn(X, Yn, θn, vn) in the vehicle 30' are updated to the optimum speed vb2. Likewise, the contents of the speed data v in the course data of the vehicle 30 are updated to the optimum speed vb3.

As a result, the vehicle 30' travels at the optimum speed vb2 from its current position G2 and arrives at the loader 60 in the optimum arrival time Thr2 as shown in FIG. 11(b). Then, the vehicle 30' can begin loading work in the optimum waiting time Tbw2. Likewise, the following vehicle 30 travels at the optimum speed vb3 from its current position G3 and arrives at the loader 60 in the optimum arrival time Thr3. The vehicle 30 can then begin loading work in the optimum waiting time Tbw3.

With the present embodiment as above, working efficiency can be maximized and the operating costs of the vehicles minimized because the travel speeds of the vehicles are set so that work can begin in the optimum waiting time.

The embodiment explained above related to a worksite to which a plurality of manned vehicles and unmanned vehicles are travelling. However, the present invention can also be applied to a worksite where a plurality of unmanned vehicles only is traveling. The present invention can also be applied to a worksite where a plurality of manned vehicles only is traveling.

Furthermore, the present embodiment related to when the monitor station 20 was established apart from the vehicles 30, 30', 40. However, the functions of the monitor station 20 may also be established in the unmanned vehicles 30, 30'. In this case, a communication device for wireless communication between the unmanned vehicles 30, 30' and the external monitor station 20 becomes unnecessary. A communication device that can perform wireless communication among the vehicles is sufficient.

What is claimed is:

1. A vehicle travel route control system applied to a case where a plurality of vehicles travel towards a plurality of worksites and perform works at the plurality of worksites, comprising:

a monitor station for changing a worksite to which the vehicles should travel and providing directly to the vehicles data for a travel route from current positions of the vehicles to the changed worksite on the basis of a result from monitoring the current positions of the plurality of vehicles and current status of the plurality of worksites; and vehicles having position measuring devices for measuring the current positions of the vehicles, providing the current positions of the vehicles measured by the position measuring devices to the monitor station and, traveling along the travel route from their current positions to the changed worksite when the data for the changed travel route are provided from the monitor station while the vehicles are on any of the travel route of the vehicle.

2. The vehicle control system, according to claim 1, wherein the monitor station changes the worksite to which the vehicles should travel so as to maximize a working efficiency at the plurality of worksites.

3. The vehicle control system, according to claim 1, wherein the monitor station selects a travel route with a shortest travel time in a case where there is a plurality of travel routes from the current positions of the vehicles to the changed worksite.

4. A vehicle travel route control system comprising: a monitor station for changing a travel route that a vehicle should travel when the vehicle is traveling along a scheduled travel route toward a worksite and providing data for the changed travel route to the vehicle; and a vehicle for turning at an intersection of the scheduled travel route onto the changed travel route and traveling along the changed travel route when the data for the travel route are provided by the monitor station, wherein, when the travel route is changed, the vehicle or the monitor station determines whether to travel along the scheduled travel route or the changed travel route after the intersection based on a distance from a current position of the vehicle on the scheduled travel route to the intersection; and wherein the vehicle is an unmanned vehicle having a position measuring device for measuring a current position of the vehicle, which provides the current position of the vehicle measured by the position measuring device to the monitor and travels according to a result of the determination.

5. A vehicle control system applied to a case where a plurality of vehicles travel towards a worksite and the plurality of vehicles perform works in sequence at the worksite, comprising: a monitor station for providing to the vehicles data for a travel route to the worksite to which the vehicles should travel and data for a travel speed; and vehicles which, when the data for the travel route and the data for the travel speed are provided from the monitor station, travel along the travel route from their current positions to the worksite at the travel speed;

wherein the monitor station estimates a waiting time until the work begins for each vehicle based on a relationship between the current positions of the plurality of vehicles and a location of the worksite, and provides the data for the travel speed to each vehicle so as to be able to begin the work in an optimum waiting time based on a result of this estimate.

6. The vehicle control system, according to claim 5, wherein the monitor station finds an order of arrival at the worksite and an arrival time from the current position until arrival at the worksite for each vehicle, based on the relationship between the current positions of the plurality of vehicles and the location of the worksite, estimates a waiting time until the work begins for each vehicle, based on the order of arrival and the arrival time thus found and a working time required for one vehicle at the worksite; and generates data for the travel speed for each vehicle based on a result of this estimate so that the vehicles can arrive at the worksite in an optimum arrival time and can begin the work in the optimum waiting time.

\* \* \* \* \*